United States Patent [19]

Weatherholt

[11] Patent Number: 4,534,417
[45] Date of Patent: Aug. 13, 1985

[54] GAUGE WHEEL CONVERSION ARRANGEMENT

[76] Inventor: Floyd V. Weatherholt, R. 3, Box 34A, Rockport, Ind. 47635

[21] Appl. No.: 925,214

[22] Filed: Jul. 17, 1978

[51] Int. Cl.³ ............... A01B 23/06; A01B 51/00; B60B 3/08
[52] U.S. Cl. .................... 172/536; 172/519
[58] Field of Search ............ 172/536, 539, 604, 624, 172/15, 16, 538, 519, 535; 152/158; 301/39 T, 399, 63 DS, 63 DD, 63 R

[56] References Cited

U.S. PATENT DOCUMENTS

| | | | |
|---|---|---|---|
| 336,475 | 2/1886 | Crossley | 172/536 |
| 876,070 | 1/1908 | McFarren | 301/2 |
| 1,469,397 | 10/1923 | Smithfield | 301/63 DD |
| 1,992,079 | 2/1935 | Ludwick | 301/39 T |
| 2,258,626 | 10/1941 | Satrom | 172/536 |
| 2,848,278 | 8/1958 | Todd | 301/63 DS |
| 3,797,418 | 3/1974 | Bridger | |

FOREIGN PATENT DOCUMENTS

| | | | |
|---|---|---|---|
| 497644 | 12/1950 | Belgium | 172/536 |
| 552558 | 2/1958 | Canada | 301/63 DS |

Primary Examiner—Richard J. Johnson
Attorney, Agent, or Firm—Edwin E. Greigg

[57] ABSTRACT

A cutting blade, for vines and the like, adaptable for use on a standard gauge or press wheel typically mounted on a shovel cultivator used in agricultural purposes. The cutting blade is readily secured for use on the gauge wheel, upon removal of the regular tire. In another invention embodiment, a specialized structure mounts the cutting blade. In any event, effective operation is provided to prevent binding during the cultivating operation.

1 Claim, 3 Drawing Figures

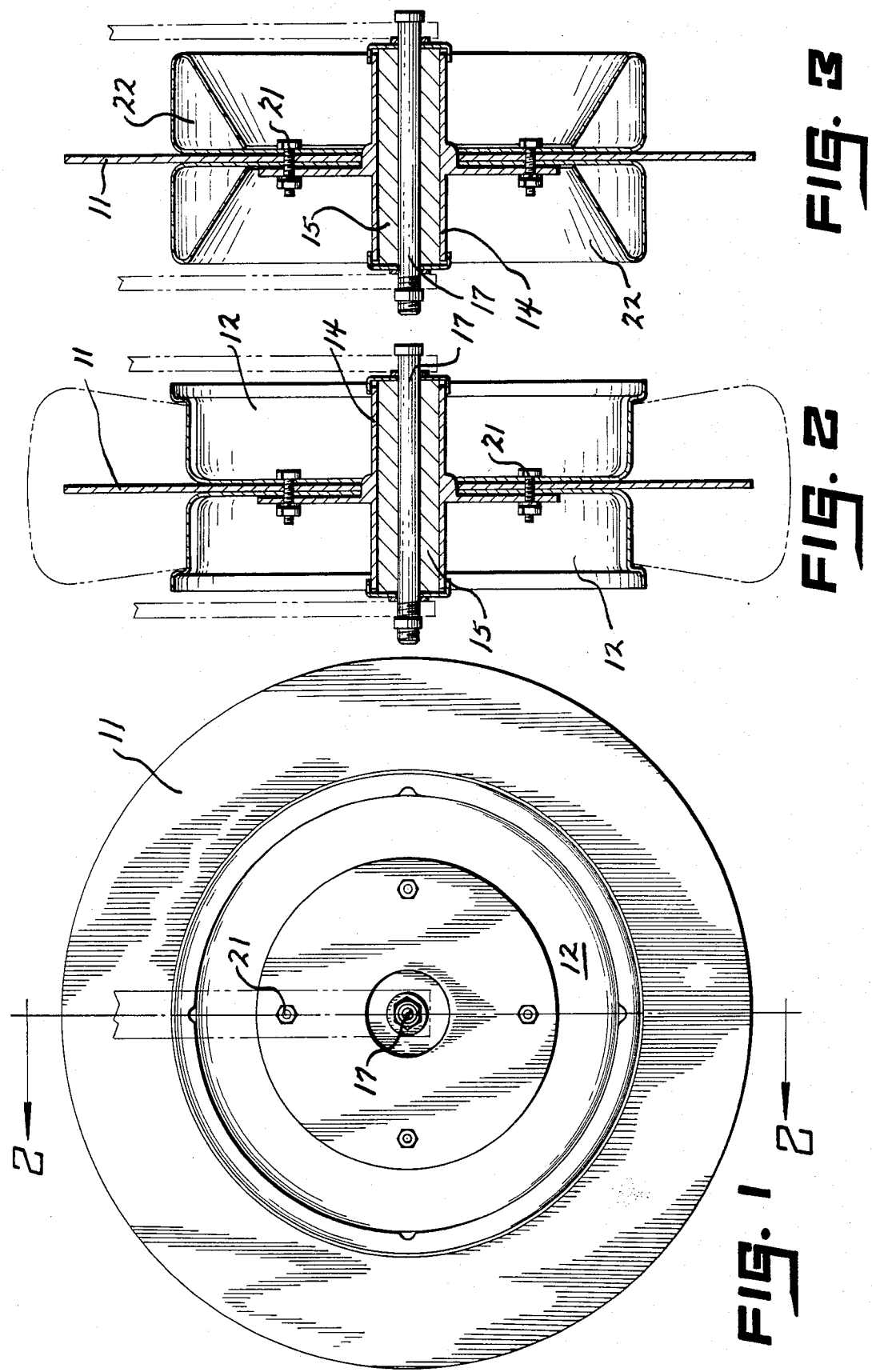

GAUGE WHEEL CONVERSION ARRANGEMENT

As is known, cultivators are an important part of an agricultural operation. A particular problem, however, is in the encountering of vines, weeds, or the like, sometimes resulting in the binding in the rear or following shovels. The invention overcomes the preceding by adapting a cutting blade to the existing gauge or press wheel, upon removal of the tire from the latter. In other words, the gauge wheel, upon modification, performs a cutting function which eliminates or at least minimizes a problem inherent with the farming operation.

In another invention form, a specialized structure is employed, presenting the same end performance. In this instance, instead of modifying an existing gauge wheel, a preformed metal structure is provided. In both this form and in the first embodiment, the cutting blade, typically a single stabilizing blade, is readily clamped or bolted to a Y-yoke on the frame of the agricultural cultivator.

A better understanding of the invention will become more apparent from the following description, taken in conjunction with the accompanying drawing, wherein FIG. 1 is a view in side elevation of a modified gauge wheel in accordance with the teachings of the invention;

FIG. 2 is a view in vertical section, taken at line 2—2 on FIG. 1 and looking in the direction of the arrows, showing details of the preferred embodiment of the invention; and, FIG. 3 is a view in vertical section of the alternative embodiment of the invention, generally comparing to the FIG. 2 embodiment.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications of the illustrated devices and such further applications of the principles of the invention as illustrated therein being contemplated as would normally occur to one skilled in the art to which the invention relates.

Referring now to FIGS. 1 and 2, the cutting blade 11 of the invention is shown as adapted to a conventional gauge wheel. In this connection, cooperating rimmed plates 12 which include annular axially extending flanges terminating in radially extending rim flanges, which typically mount a tire, until removed, are positioned on a hub 14 mounted on a bushing 15 surrounding a bolt 17. The bolt 17 is supported on a framework (shown in phantom), conventional in form and mounted on a cultivator.

In accordance with the invention, the cutting blade 11 is selectively disposed between the plates 12 of the former cutting gauge or press wheel. In this connection, threaded means 21, in any desired number, complete the assembly of the cutting blade 11 and the plates 12. In other words, the user need only remove the conventional tire from the cutting gauge or press wheel and substitute the cutting blade 11 between the plates 12. As stated, the cutting blade 11 serves to cut weeds and the like and prevent any binding during the cultivating operation.

As to FIG. 3, a similar arrangement is disclosed, except that such is specialized in that plates 22, between which the cutting blade 11 is positioned, are each bent back toward the cutting blade 11 to provide reinforcing strength. Similar fastening means are utilized for assembly purposes.

It should be evident from the preceding that the invention provides an important and useful function in the cultivating of a field for agricultural purposes. Not only is binding precluded during the usage of a conventional cultivator, but the invention is readily adaptable to a known gauge wheel. As stated, the instant cutting gauge wheel arrangement may lend itself to different forms, as shown in FIGS. 2 and 3.

The invention described hereabove is susceptible to various changes, as, for example, in proportion, in configuration as to an existing gauge or press wheel, and as to mounting on existing framework for agricultural eqipment. Thus, the preceding should be considered illustrative and not as limiting the scope of the following claims:

I claim:

1. A gauge wheel for agricultural cultivating equipment, said gauge wheel comprising a hub, a radially extending mounting projection on said hub, said wheel further comprising a pair of substantially identical mounting plates each including outer axially extending tire supporting flanges terminating in an annular radially extending tire retaining rim between which a tire may be received and retained, and a separable cutting blade adapted to be substituted for said tire and sized to be disposed between said mounting plates and extending radially beyond said outer rims thereof, whereby said mounting plates with said separable cutting blade therebetween may be assembled and secured to said mounting projection on said hub by fastening means extending through said plates and said cutting wheel to selectively convert the gauge wheel into a cutting wheel.

* * * * *